INVENTOR.
GEORGE K. FARNEY
BY Harry E. Aine
ATTORNEY

FIG. 5
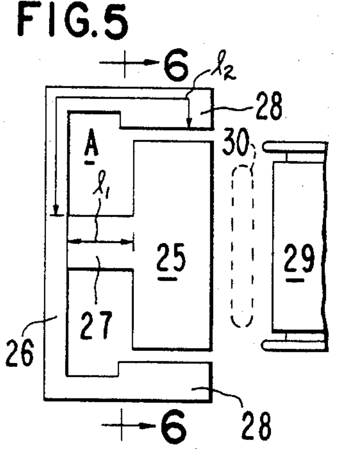
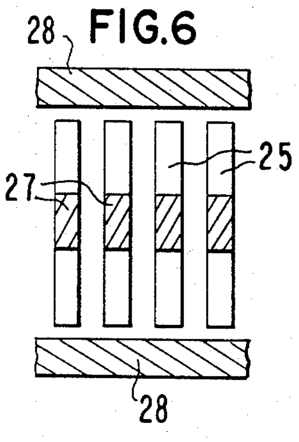
FIG. 6
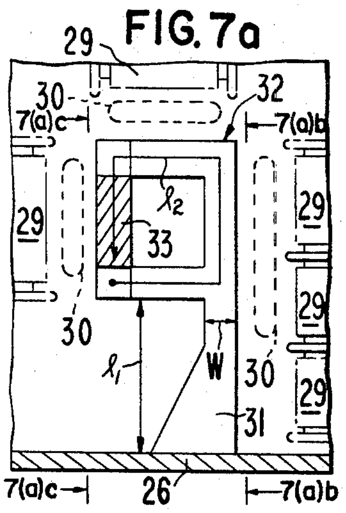
FIG. 7a
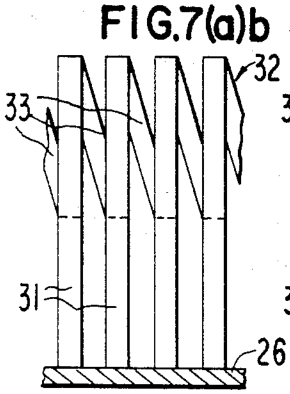
FIG. 7(a)b
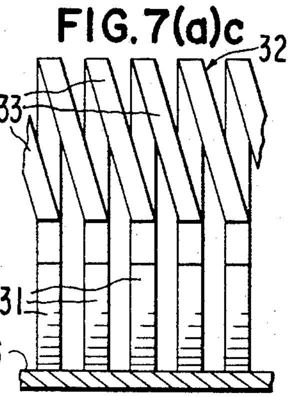
FIG. 7(a)c
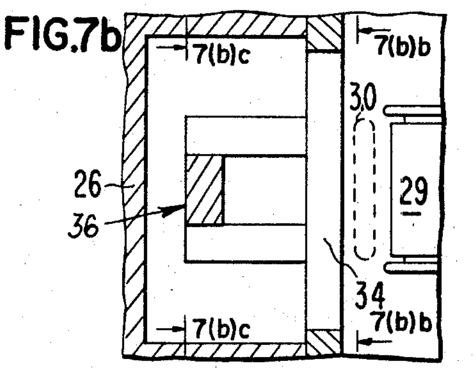
FIG. 7b
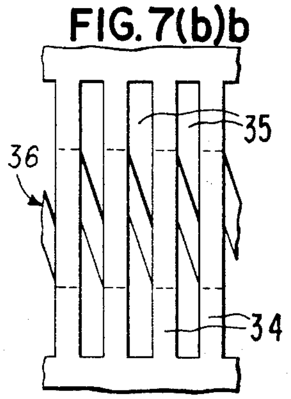
FIG. 7(b)b
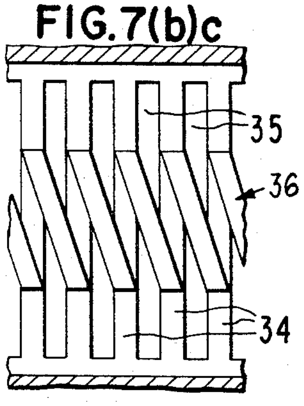
FIG. 7(b)c
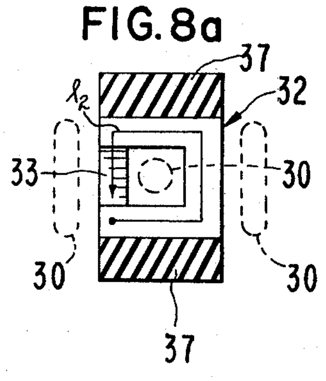
FIG. 8a
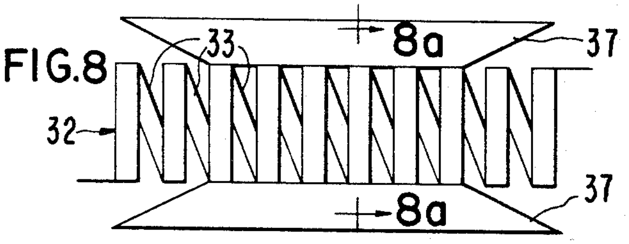
FIG. 8
INVENTOR.
GEORGE K. FARNEY
BY Harry E. Aine
ATTORNEY

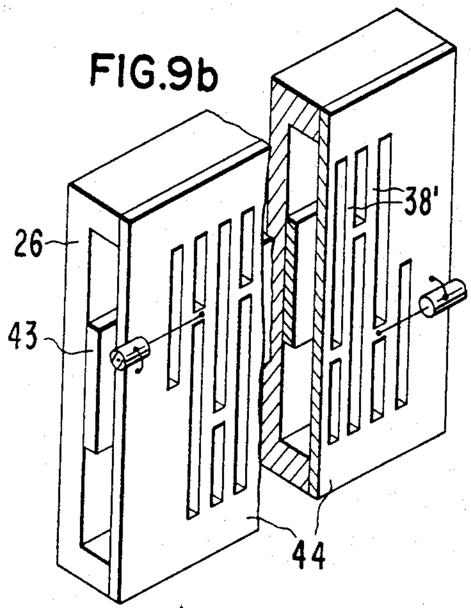
FIG. 9b
FIG. 9a
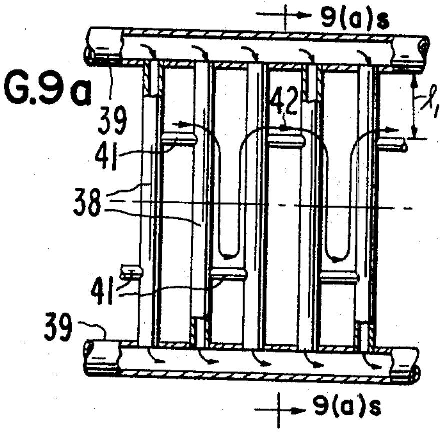
FIG. 9(a)s
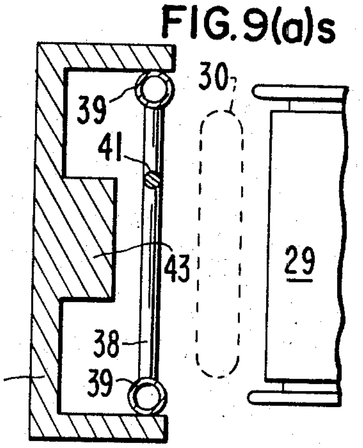
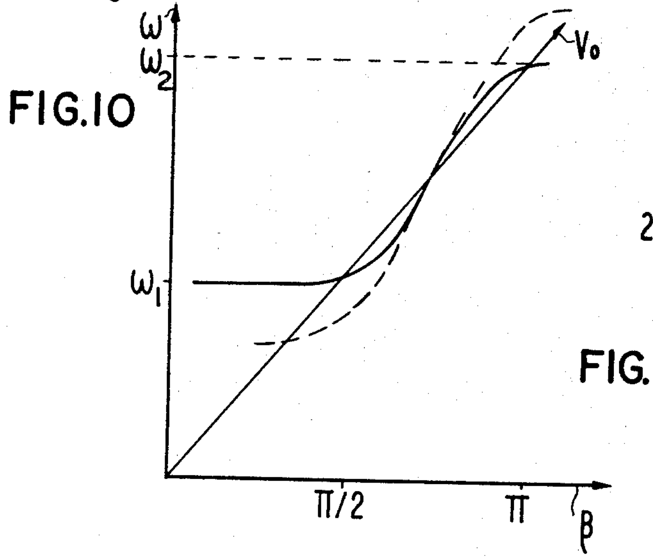
FIG. 10
FIG. 11a
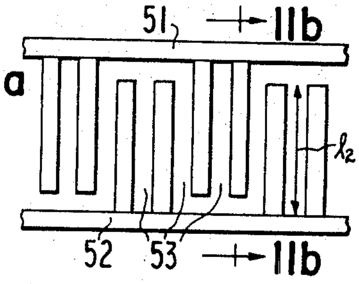
FIG. 11b
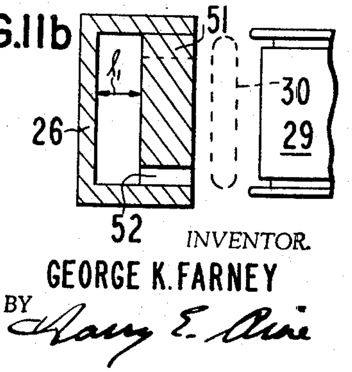
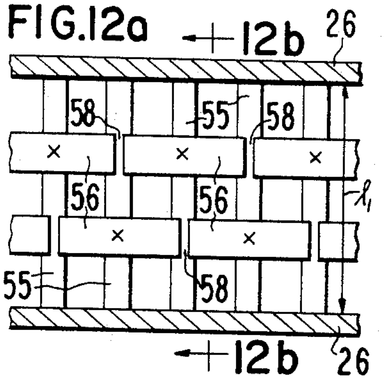
FIG. 12a
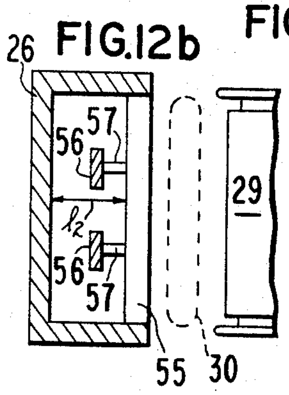
FIG. 12b
INVENTOR.
GEORGE K. FARNEY
BY [signature]
ATTORNEY Dec. 3, 1968 G. K. FARNEY 3,414,756
IMPEDANCE MATCHED PERIODIC MICROWAVE CIRCUITS AND TUBES USING SAME
Filed Dec. 28, 1965 4 Sheets-Sheet 4
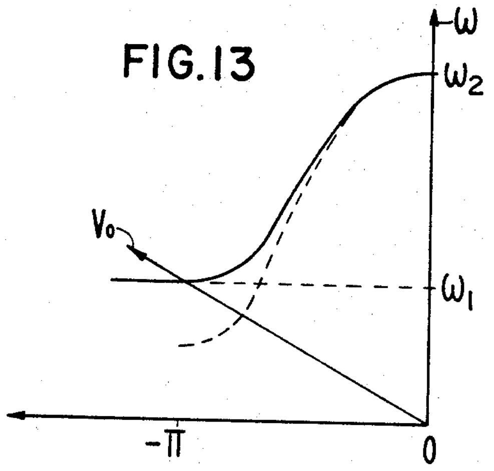
FIG. 13
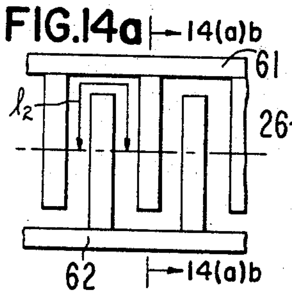
FIG. 14a
FIG. 14(a)b
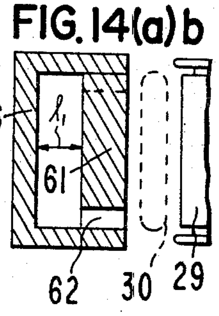
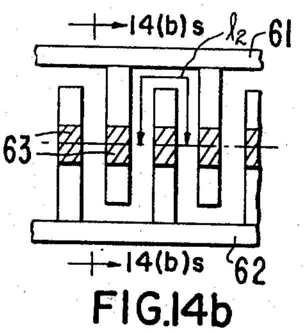
FIG. 14b
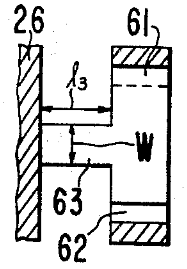
FIG. 14(b)s
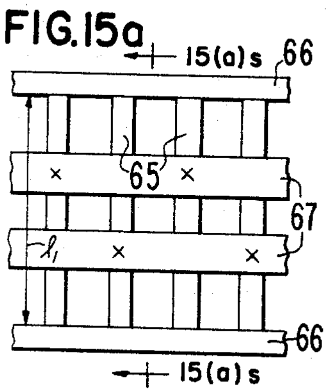
FIG. 15a
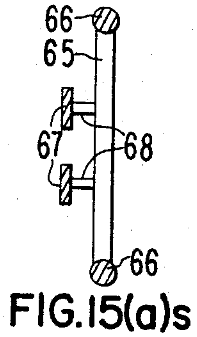
FIG. 15(a)s
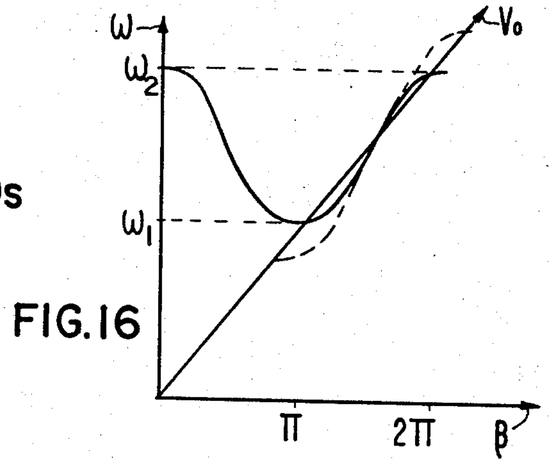
FIG. 16
FIG. 18
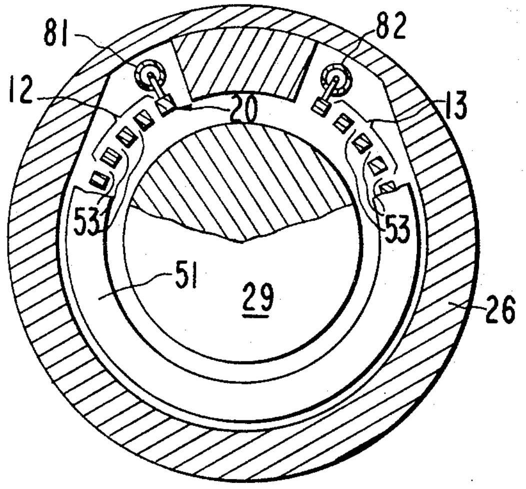
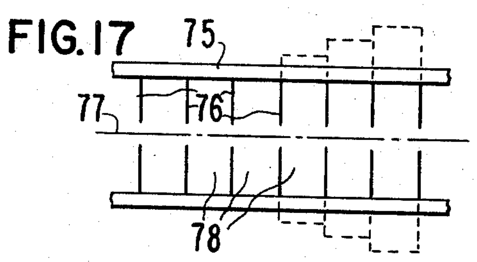
FIG. 17
INVENTOR.
GEORGE K. FARNEY
BY [signature]
ATTORNEY 3,414,756
Patented Dec. 3, 1968

3,414,756

IMPEDANCE MATCHED PERIODIC MICROWAVE CIRCUITS AND TUBES USING SAME

George K. Farney, New Providence, N.J., assignor to S-F-D Laboratories, Inc., Union, N.J., a corporation of New Jersey Filed Dec. 28, 1965, Ser. No. 516,939
10 Claims. (Cl. 315—3.5)

ABSTRACT OF THE DISCLOSURE

Improved periodic slow wave circuits are disclosed together with tubes using same. The periodic slow wave circuits are arranged in the tubes for interaction with the stream of electrons to produce output microwave energy. A transmission line is provided for extracting the output wave energy from the slow wave circuit for transmission to a suitable load. The slow wave circuit includes a main circuit portion having a dispersive characteristic with an upper and lower cutoff frequency to define the bandedges of an operating bandpass characteristic. The electron stream producing means causes a substantial percentage of the electrons of the stream to have velocities which will be synchronous with the phase velocity of wave energy on the periodic circuit at frequencies corresponding to at least one of the bandedges of the slow wave circuit. The slow wave circuit includes a main circuit portion and a terminal periodic transition circuit portion. The transition circuit portion is tapered in cutoff frequency to provide greater bandwidth at one or both of the bandedges of the transition circuit section of the periodic microwave circuit for heavily coupling the bandedges of the main circuit to the resistance of the load, thereby loading down the bandedges and preventing oscillation at these frequencies.

Figure 1:
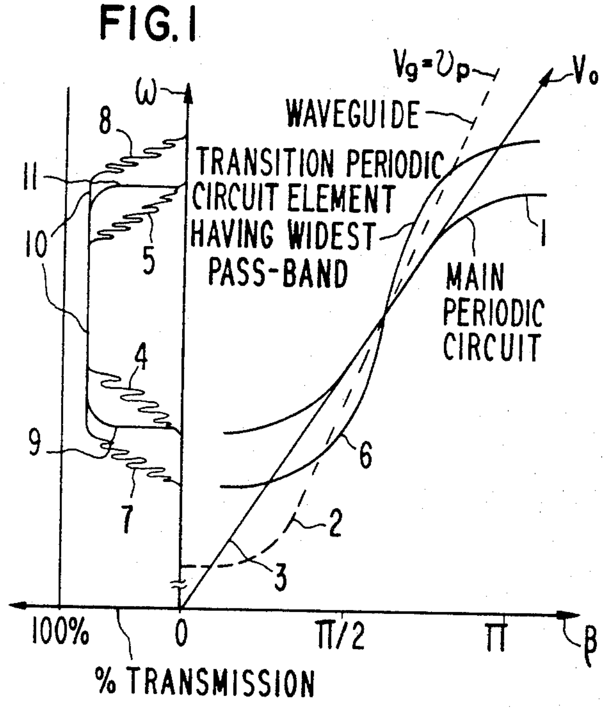

Bandedge oscillations encountered in tubes are spurious output signals obtained from microwave amplifier tubes. The spurious oscillations have frequencies at or near the operable bandedges of the passband of the tube. They are caused by reflections of wave energy either from the load or from mismatches associated with the terminal impedance transition sections of the R.F. interaction circuit of the tube. That is, poor input or output impedance matches to the slow wave circuit of a slow wave tube give rise to reflection of wave energy of a frequency corresponding to the frequency of the mismatch. These reflections produce a wave on the circuit which can be reflected back and forth many times between the mismatches. The reflected signals, if they have a synchronous phase velocity with the electron stream, are amplified in the process and lead to high power spurious signal output at these bandedge frequencies. These spurious signals are troublesome as they may be used to identify certain radars or to give away the nature of a radar countermeasures decoy signal. In addition, they can cause overheating and arcing problems in microwave circuits which do not have sufficient bandwidth to pass the spurious signals to a load. In the tube, these oscillations lead to reduced operating efficiency and if sufficiently large can lead to the complete unacceptability of the microwave amplifier for many purposes.

Crossed-field tubes are particularly susceptible to bandedge oscillations because the electron stream has an initially wider spread in electron synchronous velocities than encountered in linear type O tubes and moreover there is a pronounced tendency for wave energy on the circuit to lock the velocities of the electrons to the phase velocity of the wave energy. Thus the crossed-field tubes, although they generally have less gain than O type tubes, tend to pull more readily into bandedge oscillation.

Heretofore attempts to suppress these bandedge oscillations have taken many forms such as, for example, making improved impedance matches to and from the main microwave circuit, providing tuned energy absorbing lossy members coupled to or made a part of the main circuit for selectively absorbing power on the circuit at the bandedge oscillation frequency, and tapering the upper cutoff frequencies of the periodic sections of the slow wave circuit particularly near the output end to reduce the number of periodic sections having the same bandedge frequency. Such prior attempts have been moderately successful at relatively low power levels, i.e. up to the kilowatt peak power level. However, as the power levels increase these techniques become less able to prevent bandedge oscillations.

In the present invention a main microwave circuit of the periodic type is matched, preferably at both ends, via relatively short periodic transition sections having tapered cut-off frequencies tapering out to a frequency well beyond the bandedge of the main periodic circuit for heavily coupling, and thus heavily loading, the bandedge to the input and/or output load resistance. For filter type periodic circuits this results in steepening up the skirts of the bandedges of the passband of the main periodic circuit. When such matched periodic circuits are used in wideband microwave amplifier tubes, as the interaction circuit, the result is that the bandedge oscillations are either greatly suppressed or eliminated.

The principal object of the present invention is the provision of improved periodic microwave circuits especially useful for microwave filters, delay lines and microwave amplifier tubes.

One feature of the present invention is the provision of an improved impedance match between a source and/or load and a main periodic circuit obtained by connecting in circuit at the end of the main circuit a matching transition section of microwave circuit of the same general form as the main circuit but having its several periodic sections tapered in cut-off frequency to extend substantially beyond the bandedge of the main circuit, whereby the bandedge frequencies of the main circuit are heavily coupled to the source and/or load and thus are matched thereto.

Another feature of the present invention is the same as the preceding feature wherein the cut-off frequencies of the periodic transition sections taper out to at least 5% and preferably 10–15% beyond the high and/or the low cut-off frequency of the last adjoining periodic element of the main circuit.

Another feature of the present invention is the same as any one of the preceding features wherein both physical ends of the main periodic circuit are provided with the aforedescribed matching transition sections whereby wave reflections are prevented at both ends of the main circuits.

Another feature of the present invention is the same as the preceding feature wherein the matching transition sections at opposite ends of the main circuit are tapered in frequency to substantially different cut-off frequencies, whereby wave reflections from one transition section are not reflected from the other transition.

Another feature of the present invention is the same as any one or more of the preceding features wherein the matched main circuit is: an interaction circuit for a microwave amplifier tube, a microwave filter circuit, or a microwave delay line.

Figure 4:
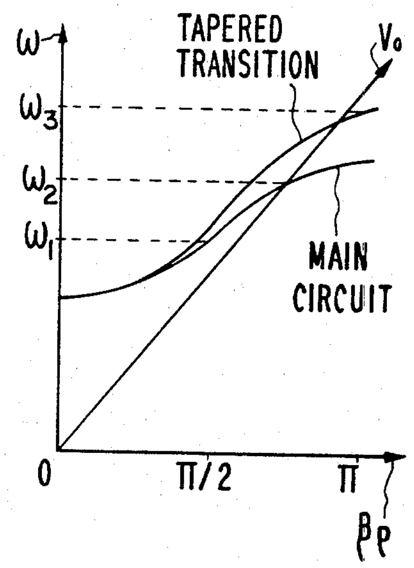
Figure 2:
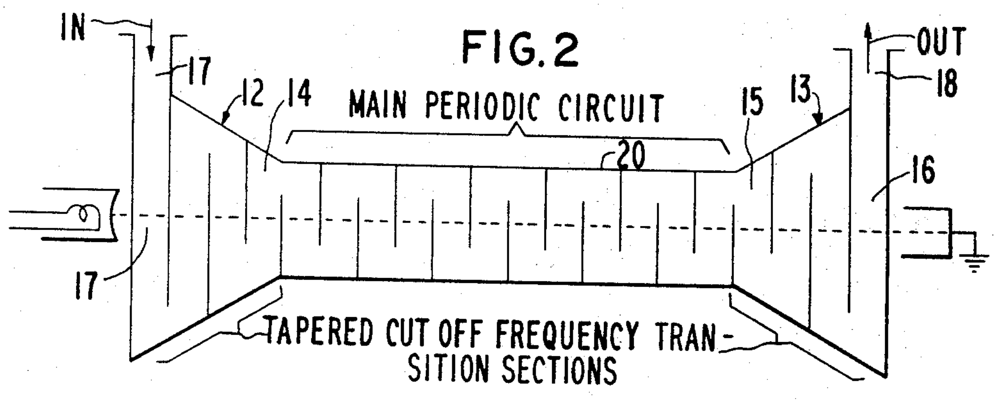
Figure 3:
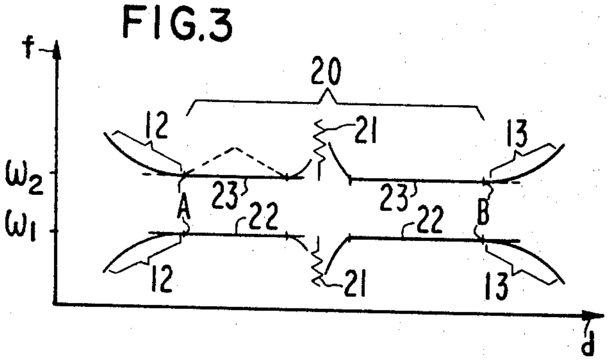

Other features and advantages of the present invention will become apparent upon persual of the following specification taken in connection with the accompanying drawings wherein:

FIG. 1 is a composite $\omega$-$\beta$ diagram and percent transmission curve showing the transmission and dispersion characteristics for a main periodic circuit, for the terminal section of a matching transition section, for a waveguide, and for the composite matched main circuit with transition sections of the present invention, FIG. 2 is a schematic line diagram of a tube having a matched periodic microwave circuit employing features of the present invention, FIG. 3 is a plot of upper and lower bandedge frequency versus distance along a severed matched periodic microwave circuit employing features of the present invention, FIG. 4 is an ω-β diagram showing the dispersion characteristics for a fundamental forward wave type main microwave circuit with matching transition sections for matching the upper bandedge, FIG. 5 is a transverse sectional view of a dual capacitively loaded vane circuit having a fundamental forward wave dispersion characteristic and showing the circuit parameters to be tapered for tapering the cut-off frequencies of the periodic sections thereof.

FIG. 6 is a longitudinal sectional view of the structure of FIG. 5 taken along line 6—6 in the direction of the arrows, FIG. 7*a* is a schematic transverse sectional view of a helix coupled vane circuit, FIG. 7(*a*)*b* and FIG. 7(*a*)*c* are elevational views of portions of the structure of FIG. 7*a* taken along lines 7(*a*)*b* and 7(*a*)*c*, respectively, FIG. 7*b* is a transverse sectional view of a helix coupled bar circuit, FIG. 7(*b*)*b* and FIG. 7(*b*)*c* are elevational views of the structure of FIG. 7*b* taken along lines 7(*b*)*b* and 7(*b*)*c*, respectively.

FIG. 8 is a longitudinal schematic diagram of a helix circuit,

FIG. 8*a* is a sectional view of the structure of FIG. 8 taken along line 8*a* in the direction of the arrows, FIG. 9*a* is a lingitudinal elevational view, partly broken away, of a stub supported meander line, FIG. 9(*a*)*s* is a sectional view of the structure of FIG. 9*a* taken along line 9(*a*)*s* in the direction of the arrows, FIG. 9*b* is a perspective view of an alternative meander line circuit, FIG. 10 is a ω-β diagram showing the dispersion characteristics for periodic circuits having a preponderance of their phase shift between the π/2 and π radians per element, FIG. 11*a* is a longitudinal elevational view of a reactively loaded interdigital line circuit, FIG. 11*b* is a sectional view of the structure of FIG. 11*a* taken along line 11*b* in the direction of the arrows, FIG. 12*a* is an elevational view, partly in section of a strapped bar circuit, FIG. 12*b* is a sectional view of the structure of FIG. 12*a* taken along line 12*b* in the direction of the arrows, FIG. 13 is ω-β diagram for a fundamental backward wave circuit, FIG. 14*a* is a longitudinal elevational view of a crown supported interdigital line circuit, FIG. 14(*a*)*b* is a sectional view of the structure of FIG. 14*a* taken along line 14(*a*)*b* in the direction of the arrows, FIG. 14*b* is a longitudinal elevational view, partly in section, of a stub supported interdigital line circuit, FIG. 14(*b*)*s* is a sectional view of the structure of FIG. 14*b* taken along line 14(*b*)*s* in the direction of the arrows, FIG. 15*a* is a longitudinal elevational view of a strapped bar circuit, FIG. 15(*a*)*s* is a sectional view of the structure of FIG. 15*a* taken along line 15(*a*)*s* in the direction of the arrows, FIG. 16 is an ω-β diagram showing the dispersion curve characteristic of the circuit of FIG. 17 operated in the first space harmonic, FIG. 17 is a schematic line diagram for a disc loaded waveguide indicating the circuit parameters to be varied for tapering one of the cut-off frequencies, and FIG. 18 is a transverse sectional view of a magnetron amplifier using the circuit of FIG. 11 and indicating the circuit parameters which are varied in the transition sections.

Referring now to FIG. 1 there is shown a composite ω-β and percent transmission line diagram depicting the mode of operation of the present invention. In this diagram line 1 shows the conventional fundamental forward wave dispersion characteristic for many periodic line circuits. The dotted line 2 represents the dispersion characteristics of a conventional rectangular waveguide. Through conventional matching techniques it is possible to match the dispersion curve 1 of the main periodic circuit to the dispersion curve of the waveguide 2 substantially only over those regions wherein the main periodic dispersion curve 1 has a constant or nearly constant slope which is nearly equal to the phase velocity which corresponds to a line 3 drawn from the origin to any point on the dispersion curve. Thus, in the conventional arrangement wherein the main periodic circuit is coupled to an output waveguide by means of the ordinary transition sections, it is found that mismatches occur near the ends of the passband where the slope of the dispersion curve for the main periodic circuit departs substantially from the constant phase velocity line 3. These impedance mismatches show up as irregularities in the transmission characteristic of the circuit as indicated in regions 4 and 5 on the percent transmission curves of the diagram. These irregularities in the transmission characteristic mean that energy is being reflected from the junctions between the main circuit and the output or input waveguides. These reflected waves can travel back and forth on the main periodic circuit interacting with the beam to produce bandedge oscillations.

In the present invention it has been found that these reflections can be heavily coupled to the load resistance and prevented, or in other words matched to the output waveguide, by means of a properly designed transition section. More specifically, it has been found that the transition section should be a section of periodic circuit having substantially the same general form, i.e. bar, vane, interdigital, etc., as the main periodic circuit. In addition, the transition section should have its bandedges tapered in frequency to extend out beyond the bandedges of the main periodic circuit by at least 5%. A typical dispersion curve for a transition section, assuming the section is made entirely of the final periodic element of the circuit section, is shown as curve 6 in the diagram. From the dispersion curve 6 it is seen that this dispersion curve for the last element of the periodic transistor circuit may be matched to the output waveguide over a wider passband as indicated on the percent transmission curve 10. It should be noted that, as in the main periodic circuit, the transition periodic circuit cannot be fully matched to the output waveguide and therefore it will have irregular transition bandedges indicated as region 7 and 8, respectively. However, according to the present invention these bandedge regions 7 and 8 are moved sufficiently out from the passband of the main periodic circuit such that these reflections will not travel back and forth on the main circuit to produce cumulative interaction with the electron stream. Also the transition sections are sufficiently short and have sufficiently low gain at these frequencies such that they will not bandedge oscillate. Since the passband of the transition section includes substantially the entire band of the main periodic circuit including the bandedges of the main circuit such main bandedges are thereby heavily loaded or matched into the waveguide section.

In order to prevent reflections on the main circuit, produced by the junction between the main circuit and the transition sections, the transition sections are each tapered in frequency such that, starting from the first element of the transition section, which is the same as the first or last element of the main periodic circuit, the cut-off frequency is moved out in discrete amounts for each successive periodic element of the transition section terminating in a final circuit element of the transition section having the dispersion characteristic of line 6, assuming the entire transition section was composed of the final element. As previously mentioned, the final section of the transition circuit should have a cut-off frequency removed by at least 5% and preferably 10 to 15% from the cut-off frequency of the adjacent first or last element of the main periodic circuit, as the case may be. When the transition circuit section is formed and arranged as above described it will be found that the bandedges of the main periodic circuit are no longer irregular but take on a very sharp and well defined form as indicated by regions 9 and 11 of the transmission characteristic.

Referring now to FIG. 2, there is shown in schematic line diagram form a linearized version of an electron tube employing the circuit matching principles of the present invention. More specifically, the circuit includes a central main periodic circuit 20 which may be tapered or untapered in cut-off frequency for electronic interaction with a beam of electrons which is passed adjacent thereto. For the sake of explanation it will be assumed that the main periodic circuit 20 has a dispersion characteristic according to curve 1 of FIG. 1. Transition sections 12 and 13 are placed at the ends of the main periodic circuit. The transition sections 12 and 13 should have the same general form of periodic circuit as that of the main periodic circuit to thereby minimize reflections therefrom. The first periodic element 14 and 15 in each transition section should have nearly the same bandedges as the main periodic circuit. Successive periodic elements of the transition sections 12 and 13 have their upper and/or lower bandedges moved out in frequency by a slight amount until the terminal periodic element of the transition section is reached which would have the dispersion characteristic of line 6 of FIG. 1.

Signal wave energy is applied to the circuit via input terminal 17 and is propagated through the transition section 12, main circuit section 20, final terminating transition section 13 and thence via output terminal 18 to a suitable load, not shown. The main periodic circuit in a crossed-field tube would be typically on the order of 10 to 15 electronic wavelengths long in the mean direction of the electron stream, or mean direction of signal power flow on the circuit, whereas the transition sections would have lengths on the order of 2 to 3 electronic wavelengths long. The transition sections 12 and 13 need not be tapered in frequency in the same way but may be tapered differently as will be more fully described in regard to FIG. 3. Furthermore, the transition sections 12 and 13 need not be in electronic interaction with the electron stream. If it was convenient they could be easily placed in the output waveguide sections. In an electron beam tube the transition sections 12 and 13 may be utilized for additional interaction with the electron stream and in such case the technique to be followed for obtaining a proper bandedge frequency taper is to alter the dimensions of the circuit which are normally used to scale the passband of the circuit but altering only those dimensions which do not interfere with the proper electronic operation of the tube.

When the tapered transition section technique of the present invention is utilized for matching microwave filter circuits or microwave delay lines, where there is no electron beam interaction, almost any parameter of the circuit may be altered to obtain the desired taper in the bandedge frequency of the transition section.

Referring now to FIG. 3 there is shown a diagram of frequency versus distance along the circuit depicting the bandedge tapering of the circuit. This diagram further illustrates the tapering of the transition sections and includes the additional feature of a circuit sever indicated by the resistor 21 midway of the circuit length. The lower line 22 represents the lower bandedge of the main circuit between points A and B, whereas the upper solid line indicates the upper bandedge between the terminals A and B of the main circuit portion. In the case of a severed circuit, it is preferred that the resistor 21 which severs the circuit includes adjacent transition sections with tapered bandedge frequencies as previously described for transition sections 12 and 13 and serving to match the main circuit 20 into the resistor 21. As before, these resistor matching transition sections should be on the order of 2 to 3 electronic wavelengths long. If the main circuit is one in which it is not possible to obtain electronic interaction near one of the lower or upper passbands of the circuit, then, in this case, only the bandedge where interaction may be obtained with the electron stream need be tapered in frequency. Assuming that interaction is obtained only near the upper bandedge of the main circuit, then only the upper bandedge frequency 23 would be tapered at both ends of the circuit in regions 12 and 13, as shown by the solid line. On the other hand, if electronic interaction with the main circuit was obtained only near the lower bandedge 22 of the passband then only the lower bandedge frequency of the transition section need be tapered to a lower frequency as shown by the solid line. While the frequency taper in the transition section may be linear or non-linear, such as for example exponential, it has been found that satisfactory results are obtained with a linear taper. Moreover, in a preferred embodiment of the present invention, the transition sections 12 and 13 are tapered in frequency to different cut-off frequencies at their outside terminal elements thereof to prevent reflections of wave energy from one transition from being reflected from the other transition section. This different taper is indicated in FIG. 3. In the case of a severed circuit as illustrated in FIG. 3 each section of main circuit 22 would include transition sections at both ends and it would be preferred if each transition section were tapered to different cut-off frequencies at their outermost terminal periodic elements.

Now that the mode of operation of the present invention has been described, several specific examples will be given in FIGS. 4–18 of practical circuit embodiments, embodying the tapered transition feature of the present invention.

FIG. 4 shows the typical dispersion characteristic of a fundamental forward wave circuit which has substantial phase shift per section extending over the range from $\pi/2$ to $\pi$. In such a circuit, the lower bandedge of the main circuit $\omega_1$ has a phase velocity which is substantially greater than any practical synchronous beam velocity $V_0$ and, therefore, electronic interaction is not obtained near or at the lower cut-off frequency of the main circuit. Thus, as previously described the tapered transition section need not be tapered to a lower frequency than $\omega_1$. On the other hand, in such circuits it is common to obtain synchronous interaction between the electron beam and waves traveling on the circuit at the upper passband edge of the circuit identified as $\omega_2$. Thus, as previously described, the transition sections 12 and 13 at both ends of the circuit should start out with periodic elements having an upper cut-off frequency substantially the same as that of the main circuit and progressively increasing in cut-off frequency to some value $\omega_3$ which is at least 5% and preferably 15% above the cut-off frequency of the main circuit. When this is done the main circuit is matched to the load and bandedge oscillation is prevented.

Referring now to FIGS. 5 and 6 there is shown a choke supported vane circuit useful in crossed-field amplifier tubes which has the fundamental forward-wave dispersion characteristic for the main circuit as shown in FIG. 4. This circuit is more fully described and claimed in copending U.S. application 463,221, filed June 11, 1965, and assigned to the same assignee as the present invention.

Briefly, the circuit comprises an array of vane resonators 25 as of copper carried from a conductive backwall member 26 as of copper via the intermediary of an array of conductive choke supports 27 as of copper. A pair of conductive ground plane members 28 as of copper overlie the top and bottom edges of the vanes 25 to obtain capacitive loading between the vanes and the ground plane such that a cathode electrode 29 which forms the typical ground plane in the conventional vane anode circuit may be positioned as desired for enhanced electronic interaction in the space 30. The circuit of FIGS. 5 and 6 may be tapered in cut-off frequency as follows: The lower cut-off frequency of the circuit may be lowered by increasing the length $l_1$ of the choke support members 27. Also increasing $l_2$ lowers the lower cut-off of the frequency. In general, any change in the circuit which increases the area A tends to lower the lower cut-off frequency. The upper cut-off frequency may be raised by decreasing $l_1$.

Referring now to FIG. *7a* there is shown a helix coupled vane circuit having the fundamental forward wave characteristics as shown in FIG. 4. Briefly, this circuit comprises an array of quarter wavelength vanes 31 as of copper carried from a conductive wall 26 with the vane tips connected together by the intermediary of a helix 32 as of copper. Electronic interaction can be obtained with the helix coupled vane circuit by running the electron stream adjacent to either the vanes or the three sides of the helix 32 as indicated in FIG. *7a* by the electronic interaction regions 30 defined between the cathode 29 and the circuit when operated at anode potential. The helix 32 is conveniently formed by a rectangular cross section tube which has three of its sides slotted with slots the same width as the slots between the adjacent vanes 31. The remaining uncut side of the tube is slotted with an array of diagonal slots leaving a metal diagonal member 33 interconnecting adjacent turns of the helix 32. The bandedges of the helix coupled vane circuit of FIG. *7a* may be tapered in frequency as follows: lengthening the length $l_1$ of the vanes 31 lowers the low frequency cut-off, the high frequency cut-off may be raised by decreasing the characteristic diameter of the helix 32 to reduce the path length $l_2$ as taken along the helix between adjacent coupled vanes.

Referring now to FIG. $7_b$ there is shown the helix coupled bar circuit having the fundamental forward wave dispersion characteristic as shown in FIG. 4. The circuit comprises an array of bars 34 as of copper joined and shorted at their ends to a conductive wall 26 and defining in the spaces between adjacent bars an array of half wavelength resonant slots 35. As in the case of the helix coupled vane circuit a helix 36 is formed to the bars 34 intermediate their length. The helix 36 extends the length of the bar array. Electronic interaction is preferably obtained with the electric fields of the slots 35 on the side of the bars remote from the helix in the electronic interaction region 30. The bandedges of the helix coupled bar circuit may be tapered in frequency as follows: The low frequency cut-off may be decreased by increasing the length of the slots 35. The high frequency cut-off frequency may be increased by decreasing the diameter of the helix 36. The helix coupled vane circuit of FIG. *7a* and the helix coupled bar circuit of FIG. *7b* is more fully described and claimed in copending U.S. application 454,140, filed May 7, 1965 now issued as U.S. Patent 3,387,170 on June 4, 1968 and assigned to the same assignee as the present invention.

FIG. 8 shows a helix circuit as of copper supported by a pair of dielectric slabs 37 as of beryllium oxide for good thermal conductivity to a suitable heat sink. Briefly, the circuit comprises a rectangular tube 32 as in FIG. *7a* which has three sides slotted with an array of transverse slots. The remaining side is then slotted by an array of diagonal slots leaving diagonally directed interconnecting conductive elements 33 connecting adjacent turns of the helix 32. The dielectric slabs are placed adjacent the top and bottom edges of the helix 32 for conducting heat from the helix to a suitable heat sink. An electron beam may be interacted with the inside of the helix or one of the other side edges thereof. In circular crossed-field tubes the helix is made by slotting a toroid shaped tube of rectangular cross section with an array of radial directed slots and then connecting the adjacent radial slots with the array of diagonally directed slots to define the diagonal members 33.

The upper cut-off frequency of the helix 32 is raised by decreasing the characteristic diameter of the helix to decrease the length $l_2$ per turn of the helix or by tapering away the spacing between the dielectric slab 37 and the helix 32 as shown in FIG. 8.

Referring now to FIG. *9a* there is shown a stub or choke supported meander line circuit having the forward-wave characteristics as shown in FIG. 4. Briefly, this circuit comprises an array of tubes 38 as of copper connected at their ends to a pair of conductive tube members 39. Transverse rods 41 connect alternate pairs of the bars 38 on opposite ends of the bars to provide a meandering R.F. circuit path as indicated by the arrows on line 42. The remaining lengths of the tubes 37 designated $l_1$, between the connecting rods 41 and the end conductive tube members 39 form high impedance choke supports for the meandering circuit path. The bars 38 are typically supported from a conductive back wall 26 by means of a crown type conductive support as of copper and the conductive wall 26 preferably includes a loading ridge member 43 projecting outwardly from wall 26 closely approaching the central region of the bars 38 for capacitive loading thereof.

Coolant may be passed through the tubes as shown by the arrows. The choke supported meander line is described and claimed in copending U.S. application 62,586, now Patent No. 3,231,780 filed October 14, 1960, now issued as U.S. Patent 3,231,780 on January 25, 1966, and assigned to the same assignee as the present invention.

FIG. *9b* shows the equivalent circuit to FIG. *9a* wherein the bars 38' are formed by slotting through a wall member 44 as of copper to form the same conductor pattern as that shown in FIG. *9a*. The choke supported meander line circuit of FIGS. *9a* and *9b* have their bandedges tapered in frequency as follows: The high frequency cut-off frequency of the circuit is raised by moving the transverse connecting rods 41 into a position closer to the center line of the circuit. The low frequency cut-off frequency is lowered by increasing the length $l_1$ of the stubs or chokes.

Some fundamental forward-wave periodic circuits have a preponderance of their phase shift per section occurring in the $\pi/2$ to $\pi$ range. Such a periodic circuit has a dispersion characteristic typically shown in FIG. 10. In such a circuit it is common to obtain bandedge oscillations at both the low cut-off frequency $l_1$ and the high cut-off frequency $\omega_2$. Periodic circuits exhibiting this type of dispersion characteristic are shown in FIGS. 11 and 12.

Referring now to FIG. 11 there is shown the reactively loaded interdigital line circuit which provides alternating series and shunt electronic interaction with the beam passable thereby. Briefly, the circuit comprises a pair of comb-like conductors 51 and 52 with the finger portions of the conductors being bifurcated to form a slot at 53. The comb-like conductors 51 and 52 are conveniently carried from a conductive back wall member 26 in the crown support manner wherein the conductive wall extends over to the backbone portions of the two conductive combs 51 and 52, respectively. The interdigitated fingers of the combs are spaced from the back wall 26 by the dimension $l_1$, and the bifurcated portion of the fingers has a slot length $l_2$. The low frequency cut-off $\omega_1$ is lowered by increasing the dimension $l_1$ and the high frequency cut-off $\omega_2$ is increased by decreasing the dimension $l_2$. Also the high frequency cut-off may be increased by decreasing the width of the slot 53. The reactively loaded interdigital line circuit is more fully described and is claimed in U.S. application 350,504, filed Mar. 9, 1964 now abandoned for continuation Ser. No. 637,007 now issued as U.S. Patent 3,358,179 on Dec. 12, 1967, and assigned to the same assignee as the present invention.

Referring now to FIG. 12 there is shown a $C_{1-3}$ strapped bar circuit having the dispersion characteristic as shown in FIG. 10. This circuit comprises an array of bars 55 as of copper which are conductively shorted at their ends by means of a supporting backwall structure 26. A pair of conductive strap members 56 as of copper extend lengthwise of the array of bars with each strap of the pair being conductively connected to alternate ones of the bars 55 by means of conductive tabs 57. Each strap 56 is segmented at 58 adjacent the non-contacting bar to provide series capacitive coupling for each of the straps 56. This circuit is more fully described in U.S. patent application 164,008, filed January 3, 1962 now issued as U.S. Patent 3,308,336 on March 7, 1967, and assigned to the same assignee as the present invention. The lower cut-off frequency $\omega_1$ of the circuit of FIG. 12 is decreased by decreasing the distance $l_2$ from the backwall 26 to the bars 55, whereas the high frequency cut-off $\omega_2$ is raised by decreasing the length of the bars $l_1$.

Some tubes utilize the backward-wave fundamental space harmonic of the periodic circuit for interaction. The dispersion curve for such a tube is shown in FIG. 13 wherein the main circuit is shown in solid. From the dispersion characteristic it can be seen that no difficulties of bandedge oscillation are encountered with the upper cut-off frequency $\omega_2$ because the beam voltage cannot be raised high enough to produec a synchronous voltage $V_0$ at the upper cut-off frequency $\omega_2$. However, bandedge oscillations can and do occur at the lower bandedge frequency $\omega_1$. The transition sections should be tapered in frequency so that the bandedge of the taper transition section is decreased in frequency to some value which is at least 5% below the lower cut-off frequency of the main circuit and preferably up to 15% below. Periodic circuits which have a fundamental backward-wave mode of operation are depicted in FIGS. 14 and 15.

Referring now to FIG. 14*a* there is shown the standard interdigital line type of circuit which is crown supported from the conductive wall 26. The interdigital line comprises a pair of comb-like conductors 61 and 62 with the fingers of the comb-like portions being interdigitated. The interdigitated comb fingers are spaced from the supporting conductive wall 26 by the dimension $l_1$ and the fingers have a length such that the successive beam field interaction spaces are spaced apart the distance $l_2$. The low frequency cut-off $\omega_1$ for the circuit of FIG. 14 is lowered by increasing the spacing $l_1$ to the interdigital fingers.

A choke supported interdigital line circuit is shown in FIG. 14*b*. In this case, each of the fingers is supported from the back wall 26 by means of a choke support member 63 having a width $\omega$ and a length $l_3$. The low frequency cut-off for the choke supported interdigital line can be lowered by reducing the width $\omega$ of the choke support or by increasing the length $l_3$ of the choke support.

Referring now to FIG. 15, there is shown a strapped bar circuit having a dispersion characteristic as shown in FIG. 13. Briefly, this circuit comprises an array of parallel bars 65 as of copper interconnected by a pair of conductive members 66. A pair of straps 67 extend lengthwise of the array over the central portion thereof. Each one of the straps 67 of the pair of straps is connected to alternate ones of the bars 65 of the array via conductive tab members 68 indicated by the crosses in FIG. 15*a*. The low cut-off frequency $\omega_1$ of this circuit is determined by the length $l_1$ of the bars 65 and the low frequency cut-off may be lowered by an increase in the length $l_1$ of the bars 65.

Referring now to FIG. 16 there is shown the dispersion characteristic of a forward wave first space harmonic periodic circuit. This type of dispersion characteristic is common of the interdigital line both of the choke and crown supported type which are operated in the first space harmonic as a forward wave circuit. It is also the dispersion characteristic for a disc loaded waveguide as shown in FIG. 17.

The crown and stub supported interdigital line circuits have previously been described in FIGS. 14*a* and 14*b*. From the dispersion characteristic for the first space harmonic shown in FIG. 16 it is seen that problems can arise with bandedge oscillations at the upper cut-off frequency $\omega_2$. Accordingly, the upper bandedge frequency of the transition section should be tapered to a higher frequency than the cut-off frequency of the main section. For both interdigital line circuits of FIGS. 14*a* and 14*b* the high frequency cut-off $\omega_2$ is raised by decreasing the dimension $l_2$. The low frequency cut-off parameters have already been discussed above.

Referring now to FIG. 17, there is shown in longitudinal section a disc loaded waveguide circuit having the dispersion characteristic as shown in FIG. 16. In this circuit bandedge oscillations can be encountered at the low frequency cut-off $\omega_1$ of the circuit. Briefly, the circuit comprises a hollow cylindrical pipe 75 as of copper having an array of transversely directed circular centrally apertured discs disposed therein for passage of the beam 77 therethrough. The low frequency cut-off of the circuit may be decreased by increasing the volume of the chamber 78 or cavity resonator defining a periodic element of the circuit defined by the space between two adjacent discs. This may be conveniently accomplished by increasing the diameter of the axial length of the chambers 78 between adjacent discs 76.

Referring now to FIG. 18 there is shown in schematic line diagram form a magnetron tube employing the tapered cut-off frequency transition section features of the present invention. More specifically, the tube comprises a reactively loaded interdigital line anode circuit of FIG. 11 coaxially surrounding a cathode emitter 29. The back wall 26 forms the vacuum envelope of the tube. A pair of axially directed coaxial lines 81 and 82 serve as input and output transmission lines for coupling to the main periodic interaction circuit 20 via transition sections 12 and 13. This type of circuit has the possibility of both upper and lower bandedge oscillation and thus the lower bandedge $\omega_1$ in the transition sections 12 and 13 is lowered by increasing the spacing from the circuit to the back wall 26. The high frequency cut-off is raised by shortening the reactive loading slots 53.

In an L band tube as shown in FIG. 18 the low frequency cut-off $\omega_1$ was 1100 mc. for the main circuit 20 with a back wall spacing $l_1$ of 0.060″ which was tapered over the transition sections 12 and 13 to 0.210″ corresponding to a low frequency cut-off $\omega_1{}^1$ for the final element (finger most remote from the main circuit 20) of the transition sections of 800 mc. The high frequency cut-off $\omega_2$ of the main circuit was 1900 mc. for a length $l_2$ of 1.2″ for the reactive loading slots 53. These slots were shortened in length to a final length of 1.0″ corresponding to a high frequency cut-off for the final element of the transition sections of 2250 mc. With the transition sections tapered as aforesaid the bandedge oscillations were completely suppressed.

Since many changes could be made in the above construction and many apparently widely different embodiments of this invention can be made without departing from the scope thereof it is intended that all matter contained in the above description or shown in the accompanying drawings shall be interpreted as illustrative and not in a limiting sense.

What is claimed is:

1. In a microwave tube apparatus, means forming a main periodic slow wave circuit, means for producing a stream of electrons adjacent said main slow wave circuit for cumulative electronic interaction with the electron stream to produce output microwave energy, transmission line means for extracting the output wave energy from said slow wave circuit for transmission to a suitable load, said main slow wave circuit being a dispersive circut having upper and lower cutoff frequencies defining the bandedges of an operating passband characteristic therebetween, said electron stream producing means causing the electrons of the stream to have velocities in synchronism with the phase velocity of wave energy on said main slow wave circuit to produce a cumulative electronic interaction, said electron stream producing means causing a substantial percentage of the electrons of the stream to have velocities synchronous with the phase velocity of the wave energy on said main circuit at frequencies corresponding to at least one of the bandedges of said main slow wave circuit over the operating range of electron beam potentials for the tube, means forming a transition section for said main periodic circuit and being connected to an adjacent terminal element of said main periodic circuit, said transition section means being a section of periodic circuit of the same general form as said main periodic circuit, said transition circuit section having its cutoff frequency corresponding to the synchronous bandedge frequency tapered in successive periodic elements from the first to the last elements thereof and being tapered in frequency from the cutoff frequency of the terminal element of said main section to a different cutoff frequency which is removed substantially more in frequency from the center of passband of said main circuit than the cutoff frequency of said terminal element of said main periodic circuit, whereby the synchronous bandedge frequency of said main periodic circuit is heavily coupled to the load by said transition section to prevent unwanted bandedge oscillation.

2. The apparatus according to claim 1 wherein one of said transition sections is provided at both ends of said main periodic circuit.

3. The apparatus according to claim 1 wherein said different cut-off frequency of said last element of said periodic transition section is at least 5% removed in frequency from the cut-off frequency of said adjacent terminal element of said main circuit section.

4. The apparatus according to claim 2 wherein said transition sections at the ends of said main periodic circuit are tapered in frequency to substantially different cut-off frequencies for their respective last elements, whereby multiple wave reflections between said transition sections over said main periodic circuit are inhibited in use.

5. The apparatus according to claim 1 wherein said transition section includes a sufficient number of periodic elements to provide a transition circuit length, taken in the mean direction of signal power flow on the transition circuit, of at least 4 $\pi$ radians of phase shift along the circuit at the center frequency of the passband at the output signal.

6. The apparatus according to claim 1 wherein said electron stream producing means includes a cathode electrode, and said main periodic circuit means is arcuate, coaxially disposed of said cathode, and operated in use at a potential more positive than said cathode electrode.

7. The apparatus according to claim 1 wherein said main and transition periodic circuits are selected from the class consisting of vane circuits, bar circuits, choke supported vane circuits, helix coupled vane circuits, reactively loaded interdigital line circuits $C_{1-3}$ strapped bar circuits, helix coupled bar circuits, and stub supported meander line circuits and wherein the upper cut-off frequency of said transition circuit section is tapered in frequency for the final element of said transition section to at least 10% above the upper cut-off frequency of the terminal element of said main circuit section disposed adjacent said transition periodic circuit.

8. The apparatus according to claim 1 wherein said main and transition periodic circuits are selected from the class consisting of, interdigital line circuit, choke supported interdigital line circuit, and strapped bar circuit, and wherein the low frequency cut-off of said transition circuit section is tapered in frequency to a final frequency for the final element of said transition section of at least 10% below the low frequency cut-off frequency of the terminal element of said main circuit section disposed adjacent said transition periodic circuit.

9. The apparatus according to claim 1 wherein said main and transition periodic circuits are coupled cavity circuits, said cavities forming the periodic elements of said periodic circuits, and wherein the volume of said cavities in said transition section is changed in successive cavities to taper the cut-off frequency.

10. The apparatus according to claim 7 wherein said main and transition periodic circuits are reactively loaded interdigital line circuits, and including a conductive wall disposed adjacent to one side of said circuit and wherein the spacing between the conductive wall and said interdigital line circuit is tapered over the length of said transition section taken in the direction of signal power flow on said transition section.

References Cited

UNITED STATES PATENTS

| | | | |
|---|---|---|---|
| 2,708,236 | 5/1955 | Pierce | 315—5.39 X |
| 2,933,639 | 4/1960 | Lally | 315—3.6 |
| 2,985,790 | 5/1961 | Kompfner | 315—3.5 |
| 3,065,373 | 11/1962 | Robertson | 315—3.6 |
| 3,219,882 | 11/1965 | Zawada et al. | 315—39.69 X |

HERMAN KARL SAALBACH, *Primary Examiner.*

S. CHATMON, Jr., *Assistant Examiner.*